US011885706B2

(12) United States Patent
Blackburn et al.

(10) Patent No.: US 11,885,706 B2
(45) Date of Patent: Jan. 30, 2024

(54) METHOD AND SYSTEM FOR MEASURING OPTICAL CHARACTERISTICS OF A CONTACT LENS

(71) Applicants: Transitions Optical, Ltd., Tuam (IE); Johnson & Johnson Vision Care, Inc., Jacksonville, FL (US)

(72) Inventors: Forrest R. Blackburn, Monroeville, PA (US); Joshua Hazle, Tampa, FL (US); Patricia Martin, Jacksonville, FL (US)

(73) Assignees: Transitions Optical, Ltd., Tuam (IE); Johnson & Johnson Vision Care, Inc., Jacksonville, FL (US)

( * ) Notice: Subject to any disclaimer, the term of this patent is extended or adjusted under 35 U.S.C. 154(b) by 74 days.

(21) Appl. No.: 17/734,240

(22) Filed: May 2, 2022

(65) Prior Publication Data
US 2022/0260455 A1 Aug. 18, 2022

Related U.S. Application Data

(63) Continuation of application No. 16/957,912, filed as application No. PCT/EP2017/084708 on Dec. 28, 2017, now abandoned.

(51) Int. Cl.
*G01M 11/02* (2006.01)
*G01N 21/59* (2006.01)
(Continued)

(52) U.S. Cl.
CPC ......... *G01M 11/0285* (2013.01); *G01N 21/59* (2013.01); *G01N 21/958* (2013.01);
(Continued)

(58) Field of Classification Search
CPC ..... G02C 7/04; G02C 7/102; G01M 11/0285; G01M 11/0235; G01N 2021/9583; G01N 21/59; G01N 21/958; G02B 1/043
(Continued)

(56) References Cited

U.S. PATENT DOCUMENTS

| 3,958,560 A | 5/1976 | March |
| 5,108,174 A | 4/1992 | Lippens |

(Continued)

FOREIGN PATENT DOCUMENTS

| CN | 1196436 C | 4/2005 |
| CN | 1732078 A | 2/2006 |

(Continued)

OTHER PUBLICATIONS

Quesnel et al., "Spectral Transmittance of UV-Absorbing Soft and Rigid Gas Permeable Contact Lenses", Optometry and Vision Science, 1995, pp. 2-10, vol. 72, No. 1.

Harris et al., "Light Transmission of Hydrogel Contact Lenses", American Journal of Optometry & Physiological Optics, 1978, pp. 93-96, vol. 55, No. 2.

(Continued)

*Primary Examiner* — Tri T Ton
(74) *Attorney, Agent, or Firm* — The Webb Law Firm (57) ABSTRACT

A method of determining the transmittance of a contact lens (200) includes the steps of obtaining a measurement of a first intensity of electromagnetic radiation reflected by ocular surface (100) with an intensity measuring device (400), positioning the contact lens (200) in direct contact with the ocular surface (100), obtaining a measurement of a second intensity of electromagnetic radiation transmitted through the contact lens (200) that is reflected a region (110) of the ocular surface (100) that is covered by the contact lens (200) with the intensity measuring device (400); and calculating the transmittance using the measurements of the first intensity and the second intensity.

18 Claims, 5 Drawing Sheets

(51) Int. Cl.
 *G01N 21/958* (2006.01)
 *G02C 7/04* (2006.01)
 *G02C 7/10* (2006.01)

(52) U.S. Cl.
 CPC ............... *G02C 7/04* (2013.01); *G02C 7/102* (2013.01); *G01N 2021/9583* (2013.01)

(58) Field of Classification Search
 USPC .................................. 356/123–137, 432–448
 See application file for complete search history.

(56) References Cited

U.S. PATENT DOCUMENTS

| | | | |
|---|---|---|---|
| 5,537,162 | A | 7/1996 | Hellmuth et al. |
| 6,084,662 | A | 7/2000 | Seaburn |
| 7,368,072 | B2 | 5/2008 | Gemert et al. |
| 7,560,056 | B2 | 7/2009 | Van Gemert et al. |
| 7,623,295 | B2 | 11/2009 | Sabeta |
| 9,334,439 | B2 | 5/2016 | DeMeio et al. |
| 9,404,863 | B2 | 8/2016 | Citek et al. |
| 9,642,533 | B2 | 5/2017 | Lai |
| 2003/0043376 | A1 | 3/2003 | Kishikawa et al. |
| 2006/0227287 | A1 | 10/2006 | Molock et al. |
| 2011/0292373 | A1 | 12/2011 | Witting et al. |
| 2015/0277147 | A1 | 10/2015 | Kim |
| 2019/0064544 | A1 | 2/2019 | Omer et al. |

FOREIGN PATENT DOCUMENTS

| | | |
|---|---|---|
| CN | 104586348 A | 5/2015 |
| CN | 104737063 A | 6/2015 |
| CN | 105143397 A | 12/2015 |
| DE | 102013100809 A1 | 7/2014 |
| EP | 0659383 A3 | 6/1995 |
| EP | 2390905 A1 | 11/2011 |
| JP | S5720636 A | 2/1982 |
| JP | 2000304653 A | 11/2000 |
| JP | 200176072 A | 3/2001 |
| JP | 2005183655 A | 7/2005 |
| JP | 2014106516 A | 6/2014 |
| WO | 9613749 A1 | 5/1996 |
| WO | 0113783 A1 | 3/2001 |
| WO | 2017149470 A1 | 8/2017 |

OTHER PUBLICATIONS

Soares, "Introduction to Optical Characterization of Materials", Practical Materials Characterization, 2014, pp. 43-92, Springer Science+Business Media, New York, USA.

METHOD AND SYSTEM FOR MEASURING OPTICAL CHARACTERISTICS OF A CONTACT LENS

CROSS-REFERENCE TO RELATED APPLICATIONS

This application is a continuation application of U.S. patent application Ser. No. 16/957,912 filed Jun. 25, 2020, which is the United States national phase of International Application No. PCT/EP2017/084708 filed Dec. 28, 2017, the disclosures of which are hereby incorporated by reference in their entireties.

BACKGROUND OF THE INVENTION

Field of the Invention

This invention relates to a method and measurement system for determining optical characteristics of a contact lens, such as a photochromic contact lens, under real-world conditions.

Technical Considerations

Optical elements that absorb electromagnetic radiation in the visible region of the electromagnetic spectrum are used in a variety of articles, such as contact lenses. A "contact lens" is explicitly defined herein as a device that physically resides in or directly on the eye. By "directly on" is meant in direct contact with. It is to be understood that the terms "directly on" and "in direct contact with" also include conditions where a tear film is present between the contact lens and the eye.

Electromagnetic radiation absorbing contact lenses improve the viewing comfort of the wearer and enhance the wearer's ability to see in bright conditions. Examples of electromagnetic radiation absorbing contact lenses include fixed tint contact lenses and photochromic contact lenses.

Photochromic contact lenses change tint in response to certain wavelengths of electromagnetic radiation. Photochromic contact lenses provide the wearer with improved vision and comfort when exposed to bright light conditions but return to a non-absorbing or lesser-absorbing state in low light conditions. Photochromic contact lenses provide comfort and ease of viewing over a range of lighting conditions and eliminate the need for switching between pairs of spectacles when moving between indoor/low light and outdoor/bright light locations.

Known methods for testing or quantifying the amount of light transmitted by contact lenses, such as photochromic contact lenses, utilize a conventional optical bench under laboratory conditions. The photochromic contact lens is activated, typically by exposure to ultraviolet radiation, and is affixed to the optical bench for testing. While optical benches are well-suited for laboratory conditions, they may not provide an accurate determination of the optical characteristics and/or aesthetic characteristics of the photochromic contact lens under real-world conditions, such as when actually being worn under ambient lighting conditions. The color or tint/darkness of the activated photochromic contact lens can appear different when actually being worn by a user under real-world conditions compared to when the contact lens is measured on an optical bench under laboratory conditions. Also, the perceived aesthetics of the photochromic contact lens can differ when actually being worn due to the varying color and shading characteristics of the human eye.

The transmission of light by photochromic contact lenses changes based on the amount and duration of actinic radiation received. If the photochromic contact lens were first activated by a wearer under ambient conditions and then transferred to a laboratory optical bench for measurement, the level of activation of the photochromic contact lens may be different between the time it is activated and the time that it has been affixed to the optical bench for measurement. Existing methods of maintaining activation under laboratory conditions, such as exposing the photochromic contact lens to Xenon arc lamps, may not accurately recreate real-world conditions.

The ability to determine optical characteristics of a contact lens, e.g., an activated photochromic contact lens, outside of a conventional laboratory environment has several applications, including in quality control and in marketing. Testing photochromic contact lenses under real-world conditions provides useful data on the comfort and reliability experienced by a wearer. Additionally, the ability to accurately determine real-world characteristics of photochromic contact lenses may provide purchasers with a quantifiable or qualifiable basis by which to judge various photochromic contact lenses for use in their geographic location or for their desired purpose.

Thus, it would be desirable to provide a method and/or system for measuring optical characteristics of contact lenses, such as a photochromic contact lens, under real-world conditions. A further need exists for the method and/or system to be portable.

SUMMARY OF DISCLOSURE

A method for determining the transmittance of electromagnetic radiation through a contact lens, comprises: measuring a first intensity of electromagnetic radiation reflected by an ocular surface; positioning a contact lens directly on and covering a portion of the ocular surface; measuring a second intensity of electromagnetic radiation transmitted through the contact lens that is reflected by a region of the ocular surface that is covered by the contact lens; and calculating the transmittance of electromagnetic radiation through the contact lens using the measurements of the first intensity and the second intensity.

A method for determining the transmittance of electromagnetic radiation through a photochromic contact lens, comprises: positioning a non-activated photochromic contact lens directly on and covering a portion of an ocular surface; measuring a first intensity of electromagnetic radiation reflected by a region of the ocular surface covered by the non-activated photochromic contact lens; activating the photochromic contact lens on the ocular surface; measuring a second intensity of electromagnetic radiation transmitted through the photochromic contact lens that is reflected by a region of the ocular surface that is covered by the activated photochromic contact lens; and calculating the transmittance of electromagnetic radiation through the photochromic contact lens using the measurements of the first intensity and the second intensity.

A method for determining the transmittance of electromagnetic radiation through a contact lens, comprises: measuring a first intensity of electromagnetic radiation transmitted through an activated contact lens that is reflected by a region of the ocular surface covered by the activated contact lens; measuring a second intensity of electromagnetic radiation reflected by a region of the ocular surface that is not covered by the contact lens; converting the first and second measurements to CIE color coordinates; and calculating the transmittance of electromagnetic radiation through the contact lens using the difference in the CIE color coordinates.

The contact lens is in direct contact with the ocular surface.

The measurements of the first and second intensities can be made using a photo imaging device.

The electromagnetic radiation can be one or more wavelengths of visible light or one or more ranges of wavelengths of visible light.

A method for determining the transmittance of a photochromic contact lens at a desired level of activation, comprises: selecting a desired wavelength range of electromagnetic radiation; selecting a desired level of activation of the photochromic contact lens; exposing the photochromic contact lens to actinic radiation at the desired wavelength range until the photochromic contact lens reaches the desired level of activation; maximizing visibility of a region of a sclera of an eye; taking a first image of the region of the sclera with an imaging device, wherein the imaging device is configured to record light intensity data over the selected wavelength range; recording a first set of electromagnetic radiation intensity data for the selected wavelength range taken from the first image; covering the region of the sclera with the activated photochromic contact lens; taking a second image of the region of the sclera with the imaging device; recording a second set of electromagnetic radiation intensity data for the selected wavelength range taken from the second image; entering the first and second sets of data into a database; and using a processor to determine the transmittance of the photochromic contact lens.

DESCRIPTION OF THE PREFERRED EMBODIMENTS

As used in the specification and the claims, the singular form of "a", "an", and "the" include plural referents, unless the context clearly dictates otherwise.

Spatial or directional terms, such as "left", "right", "up", "down", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value.

The term "such as" is to be understood as being non-limiting. That is, the elements recited after "such as" are to be understood as being non-limiting examples of the recited features.

All ranges disclosed herein encompass the beginning and ending range values and any and all subranges subsumed therein. The ranges disclosed herein represent the average values over the specified range.

Use of the terms "covered by" or "covers" with respect to the positional relationship between examples of an ocular surface and examples of a contact lens means in direct contact. For example, a region of an ocular surface covered by a contact lens means that the contact lens is in direct contact with the ocular surface.

The term "uncovered" or "not covered" used with respect to the positional relationship between examples of an ocular surface and examples of a contact lens means that the ocular surface is not "covered" by a contact lens from the frame of reference of an imaging device.

The terms "polymer" or "polymeric" include oligomers, homopolymers, copolymers, polymer blends (i.e., mixtures of homopolymers or copolymers), and terpolymers, e.g., polymers formed from two or more types of monomers or polymers.

The term "ultraviolet radiation" means electromagnetic radiation having a wavelength in the range of 100 nanometers (nm) to less than 380 nm. The terms "visible radiation" or "visible light" mean electromagnetic radiation having a wavelength in the range of 380 nm to 780 nm. The term "infrared radiation" means electromagnetic radiation having a wavelength in the range of greater than 780 nm to 1,000,000 nm.

All documents referred to herein are "incorporated by reference" in their entirety.

By "at least" is meant "greater than or equal to". By "not greater than" is meant "less than or equal to".

Wavelength values, unless indicated to the contrary, are in nanometers (nm).

The term "includes" is synonymous with "comprises".

The terms "actinic radiation" and "actinic light" mean electromagnetic radiation capable of causing a response in a material, such as transforming a photochromic material from one activation state to another activation state.

The term "photochromic" means having an absorption spectrum for at least visible radiation that varies in response to absorption of at least actinic radiation.

When referring to different conditions, the terms "first", "second", etc., are not intended to refer to any particular order or chronology but instead refer to different conditions or properties. For illustration, the first state and the second state of a photochromic contact lens can differ with respect to at least one optical property, such as to the absorption or linear polarization of visible and/or ultraviolet (UV) radiation. For example, a photochromic contact lens can be clear in the first state and colored in the second state. Alternatively, the photochromic contact lens can have a first color in the first state and a second color in the second state.

The term "optical" means pertaining to or associated with light and/or vision.

The term "fixed tint" means having colorants that are non-photosensitive, i.e., do not physically or chemically respond to electromagnetic radiation with regard to the visually observed color thereof.

The term "transparent" means the material has the property of transmitting light without appreciable scattering so that objects lying beyond are visible.

The term "activated" means that the optical device has been exposed to conditions, such as actinic radiation, and for a sufficient period of time, such that the contact lens shifts from a first activation state to a second activation state with respect to at least one optical property, such as the absorption or linear polarization of visible and/or ultraviolet (UV) radiation.

The term "desired level of activation" may be a quantitative or qualitative determination. A desired level of activation of a photochromic contact lens may be the level of activation that that device has reached by being exposed to ambient or directed light in a particular environment (wavelength or range of wavelengths) for a selected period of time.

By CIE color coordinates (e.g., X, Y, Z) is meant coordinates in accordance with the CIE XYZ color system specified by the International Commission on Illumination, including the CIE color matching functions xyz. CIE color coordinates may be in accordance with CIE XYZ 1931, 1664, and/or 2004 formats.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

Figure 1:
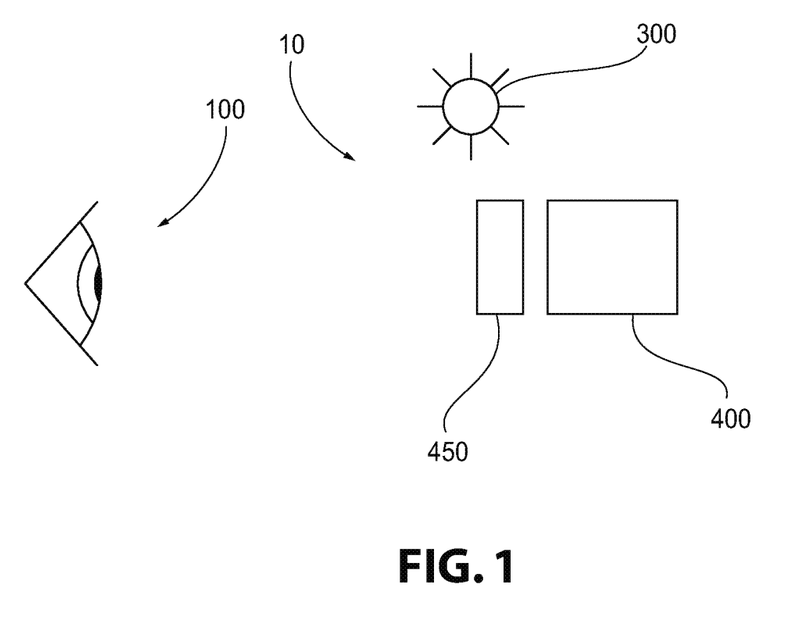
FIG. 1 is a side, schematic view of an intensity measurement system comprising an intensity measuring device for measuring electromagnetic radiation intensity data reflected from an ocular surface.

FIG. 1 is a schematic representation of a measurement system 10 of the invention. The measurement system 10 includes an ocular surface 100, a light source 300, and an imaging device 400.

The light source 300 emits electromagnetic radiation in one or more wavelengths or one or more ranges of wavelengths. The electromagnetic radiation can be visible light. The light source 300 may also emit electromagnetic radiation in one or more other spectra of electromagnetic radiation, such as the infrared (IR) and/or ultraviolet (UV) spectra. Although not shown in the Figure, multiple light sources 300 can be used. If a plurality of light sources 300 is present, the light sources 300 can emit the same wavelength or wavelength range of electromagnetic radiation, or some of the light sources 300 may emit different wavelengths or ranges or wavelengths of electromagnetic radiation than other of the light sources 300. Examples of the light source 300 include the sun, in which case the electromagnetic radiation would be ambient outdoor light. Or, the light source 300 can be an artificial light source, such as an incandescent light bulb, florescent light, compact florescent light, or any other light source that emits electromagnetic radiation in a desired spectrum.

The ocular surface 100 can be a surface that approximates one or more aspects of the human eye, such as the temperature, moisture content, reflectance, color, transmittance, or other physical or optical properties of the human eye. For example, the ocular surface 100 can be the surface of a human eye. The ocular surface 100 can be the surface of an animal eye.

With reference to FIG. 1, electromagnetic radiation, e.g., visible light, emitted from the light source 300 is reflected off of one or more regions of the ocular surface 100. The imaging device 400 captures image data of the electromagnetic radiation reflected from ocular surface 100. The imaging device 400 is an intensity detection device and measures the intensity of electromagnetic radiation reflected from one or more portions of the ocular surface 100. The intensity data, as a function of position, can be included in the image data taken by the imaging device 400. It is not necessary for the imaging device 400 to have a high resolution in order to measure the intensity of electromagnetic radiation reflected by the ocular surface 100. However, it is preferable that the imaging device 400 possess good photometric linearity. It is further preferable that the imaging device 400 possess a high dynamic range. Examples of the imaging device 400 include digital cameras, charge-coupled devices (CCDs), complementary metal-oxide semiconductor (CMOS) sensors, photodiode arrays, photomultiplier arrays, or a single sensor (1×1 array) with optics to focus in on any given area size. An additional example of an imaging device 400 is a hyper-spectral imager, wherein the image sensor at each pixel may take data over the entire spectrum of visible light, not just a narrowed band due to filters. The imaging device 400 may take images that are in color or black and white. An example of a suitable imaging device 400 to serve as an intensity measuring device is a model AVT F-145 B/C Stingray camera, commercially available from Allied Vision Technologies of Exton, Pennsylvania Images taken using a High Dynamic Range ("HDR") function also may be used, provided that exposure times and dark values are known, and assuming a linear relationship between exposure time and measured intensity value.

Image data, including data on light intensity and position, can be stored in the internal memory of the imaging device 400. Alternatively, image data can be stored in a removable or external memory, or in any other manner known in the art.

The imaging device 400 is configured to take image data that includes intensity data of one or more selected wavelengths or one or more wavelength ranges of electromagnetic radiation. For example, the imaging device 400 can be configured to take image data that includes intensity data of one or more selected wavelengths or one or more wavelength ranges of electromagnetic radiation within the range of 1 nm to 1,000 nm. For example, the imaging device 400 can be configured to take image data that includes intensity data of one or more selected wavelengths or one or more wavelength ranges of visible light. For example, the imaging device 400 may take data on the intensity of electromagnetic radiation in the red, green, and blue ranges. Alternatively or additionally, the imaging device 400 may take intensity data of electromagnetic radiation in the cyan, yellow, green, and/or magenta ranges. Other wavelength ranges also may be used. It will be understood by a skilled artisan that various manufacturers and imaging devices define these color ranges differently, and that specific wavelengths or wavelength ranges for each color, and some ranges, may overlap. Exemplary ranges for red, green, and blue are 635±20 nm, 555±20 nm, and 460±20 nm, respectively. Any range or combination of wavelength ranges in the visible light spectrum, which includes wavelengths between approximately 380-780 nm, may be used.

Specific wavelength ranges of visible light for which data may be taken can be chosen. These wavelength ranges may correspond to the colors of specific photochromic dyes present in the optical element, such as a photochromic contact lens, to be tested. The wavelengths can be any combination of wavelengths, and can be defined by the use of a filter. A filter 450 corresponding to a selected or desired range or ranges of wavelengths of electromagnetic radiation, e.g., visible light, may be placed between the ocular surface 100 and the imaging device 400. The filter 450 limits the light entering the imaging device 400 to the desired wavelength or range of wavelengths. The filter 450 may be placed over a lens of the imaging device 400. Examples of the filter 450 include a band pass filter, a short pass filter, a long pass filter, or other filters known in the art. The filter 450 may be a notch filter centered on one or more wavelengths of electromagnetic radiation in any desired wavelength range. The notch filter may transmit a narrow range of wavelengths of electromagnetic radiation centered on the desired wavelength, while blocking the rest of the spectrum of visible light. The filter 450 may be a three-notch filter. The filter 450 may be a three-notch filter with the notches centered at 635±20 nm, 555±20 nm, and 460±20 nm, respectively. Measurements of intensity values may be made over the same range of wavelengths of light. The filter 450 may be chosen to correspond to, or differ from, the color of the ocular surface 100.

Figure 2:
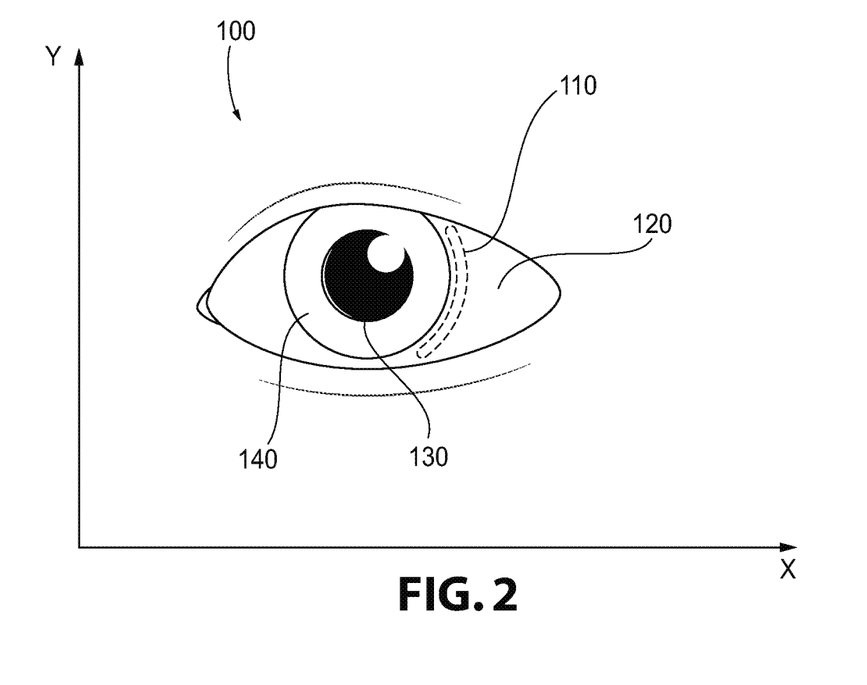
FIG. 2 is a front, schematic view of an ocular surface illustrating a measurement region.
Figure 3:
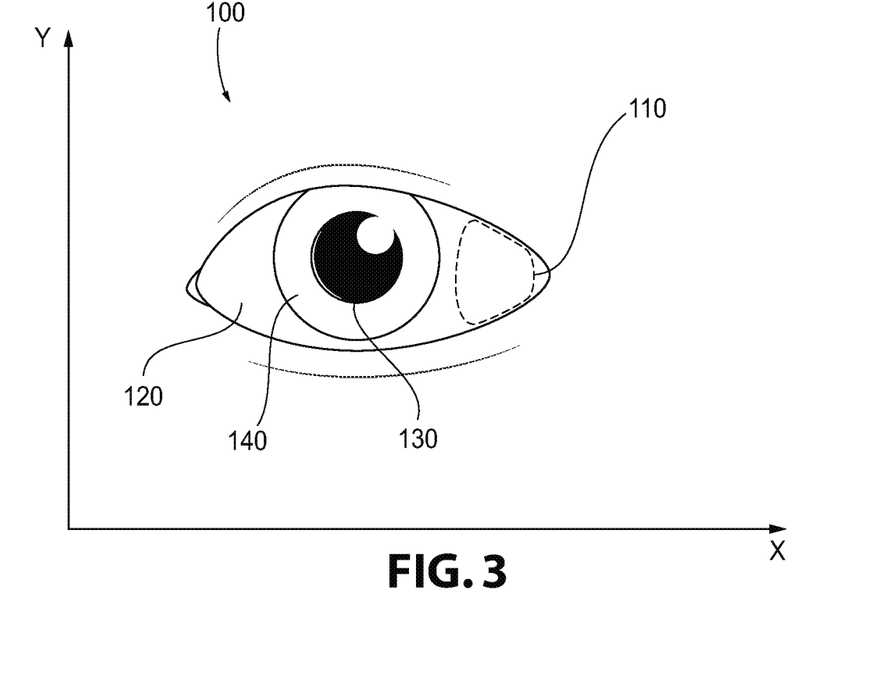
FIG. 3 is a front, schematic view of an ocular surface illustrating another measurement region.

FIGS. 2 and 3 are schematic representations of the ocular surface 100 imposed over x and y axes. The Figures shows the ocular surface 100 wherein no portion thereof is covered by a contact lens. With reference to FIGS. 1 to 3, a first measurement of the intensity of electromagnetic radiation reflected from the ocular surface 100 is taken with the imaging device 400. The first measurement can be taken on a selected portion of the ocular surface 100. For example, the first measurement can be taken over a region 110 of the ocular surface 100. The region 110 may be a region of the sclera 120 of a human eye. The region 110 may include a relatively large area of the ocular surface 100. For example, the region 110 may include 1 square millimeter ($mm^2$) to 25 $mm^2$, such as 1 $mm^2$ to 10 square millimeters ($mm^2$). The area of the region 110 may be substantially equivalent to the area of the contact lens to be measured. Or, the area of the region 110 may be greater than or less than the area of the contact lens to be measured. FIG. 2 is a schematic representation of the ocular surface 100 in which the region 110 is located on a portion of the sclera 120 that is adjacent to the iris 140 of the ocular surface 100. The region 110 illustrated in FIG. 2 is a curved, elongated region. In FIG. 3, the region 110 is spaced from the iris 140. The region 110 illustrated in FIG. 3 is a circular or oval region. It is to be understood that the region 110 can be of any shape. It also is to be understood that region 110 may be located on any portion of the ocular surface 100, including but not limited to the iris 140, pupil 130, sclera 120, or any combination thereof.

Figure 4:
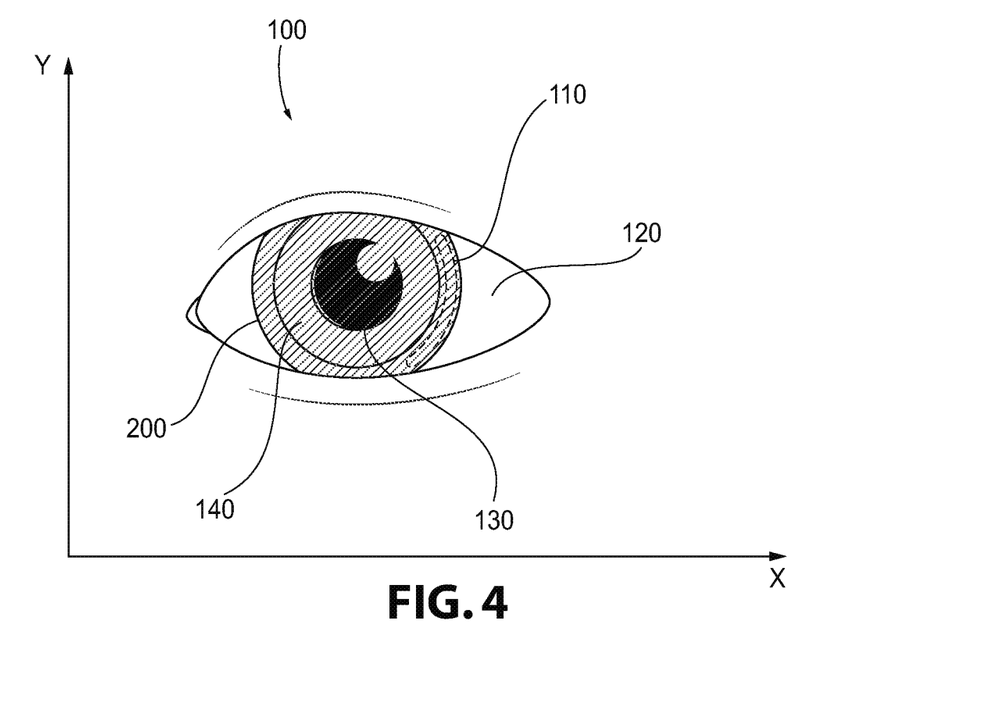
FIG. 4 is a front, schematic view of the ocular surface of FIG. 2 showing a contact lens in direct contact with a portion of the ocular surface.
Figure 5:
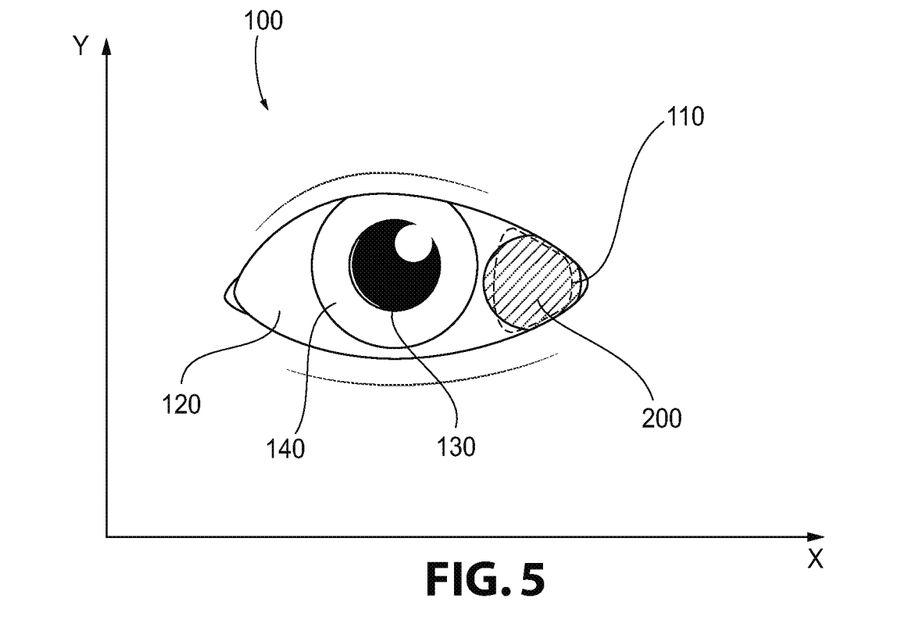
FIG. 5 is a front, schematic view of the ocular surface of FIG. 3 showing a contact lens in direct contact with a portion of the ocular surface.

FIGS. 4 and 5 are schematic representations of the ocular surface 100 in which a contact lens 200, is placed such that it covers, i.e. is in direct contact with, the ocular surface 100. For example, the contact lens 200 may be a fixed-tint contact lens 200, or a photochromic contact lens 200. When the contact lens 200 is a photochromic contact lens, the photochromic contact lens 200 may be activated or non-activated. The contact lens 200 is in direct contact with the ocular surface. In the following examples, the contact lens 200 will be considered to be a photochromic contact lens 200 that is located in direct contact with the ocular surface 100. The contact lens 200 can cover all or a portion of the region 110. If the contact lens 200 is a photochromic contact lens 200, the photochromic contact lens 200 can be exposed to actinic radiation on the ocular surface 100 for a period of time to achieve a desired level of activation. For example, for a period of time to achieve full activation.

With reference to examples schematically depicted in FIGS. 4 and 5, the second measurement of the intensity of electromagnetic radiation, e.g., visible light, transmitted through the contact lens 200 that is reflected by the ocular surface 100 is taken with the imaging device 400. The second measurement includes intensity data over at least a portion of the region 110 of the ocular surface 100 covered by a contact lens 200. The area of the contact lens 200 may be substantially equivalent to the area of the region 110. Or, the area of the contact lens 200 may be greater than the region 110, or less than the region 110. The wavelength or range of wavelengths measured for the first measurement and the second measurement preferably are the same. It is to be understood that examples of an ocular surface 100 may include multiple regions 110 from which intensity data are measured simultaneously, or in sequence.

When the imaging device 400 captures image data over all or at least a portion of the surface area of the contact lens 200, the intensity values from across the contact lens 200 can be compared. Such a comparison is useful in that it allows for the identification in differences in transmittance across the contact lens 200. This indicates the location of certain image defects on the contact lens 200. In this circumstance, the region 110 of an ocular surface 100 can correspond in size with the desired area of the contact lens 200 to be measured. Alternatively, multiple second measurements may be taken wherein the contact lens 200 covers different portions of the ocular surface 100, and intensity data can be taken from regions 110 of the ocular surface 100 in those images.

With specific reference to FIGS. 2 and 4, the contact lens 200 may cover portions of the sclera 120 even when the center area of the contact lens 200 is positioned over the pupil 130. The region 110 in FIGS. 2 and 4 is located on a portion of the sclera 120 that is adjacent to the iris 140. The region 110 is located close enough to the iris 140 that, when the contact lens 200 is positioned on the ocular surface 100 in an orientation where the center area of the contact lens 200 is positioned over the pupil 130, the region 110 of the sclera 120 is covered by at least a portion of the contact lens 200. For example, covered by a peripheral portion of the contact lens 200. In this configuration, the second measurement is taken over at least a portion of the region 110 located between the outer peripheral edge of the contact lens 200 and the outer peripheral edge of the iris 140.

FIG. 5 depicts an example wherein the contact lens 200 is positioned to cover a portion of the ocular surface 100 so that the center area of the contact lens 200 does not cover the iris 130. In this configuration, the region 110 of the sclera 120 is all or partly covered by the contact lens 200, and the second measurement of the intensity of electromagnetic radiation, e.g., visible light, reflected by the ocular surface 100 is taken with the imaging device 400. The intensity data can include data from the center area of the contact lens 200. That is the portion of the contact lens 200 that is most likely to be positioned over a wearer's pupil 130 during normal wear and, thus, may have the most effect on the wearer's experience.

With reference to FIGS. 1 to 5, in order to compare intensity data between the first measurement and the second measurement, position data on the ocular surface 100 is determined. As above, a position on the ocular surface 100 between the two intensity measurements may be determined by comparing the shape of the ocular surface 100 in each image. This may be accomplished by visually comparing the images and choosing a range of coordinates in each image to be analyzed. Software stored in the memory of the imaging device 400, or in an external computing device, may be applied by a processor to automatically compare the images in order to determine the region 110 covered by the contact lens 200. A processor may be located in the imaging device 400, or an external processor may be used.

In order to ensure that intensity data taken from the same region 110 of the ocular surface 100 are compared when analyzing the first and second measurements, relative movement between the ocular surface 100 and the imaging device 400 may be limited between measurements. Relative movement between the ocular surface 100 and the imaging device 400 may be limited by positioning imaging device 400 on a fixed or portable stand, not shown. If the ocular surface 100 is a human eye, movement of a wearer's head may be limited by a head rest, chin rest, bite bar, or other mechanism known in the art.

Figure 6:
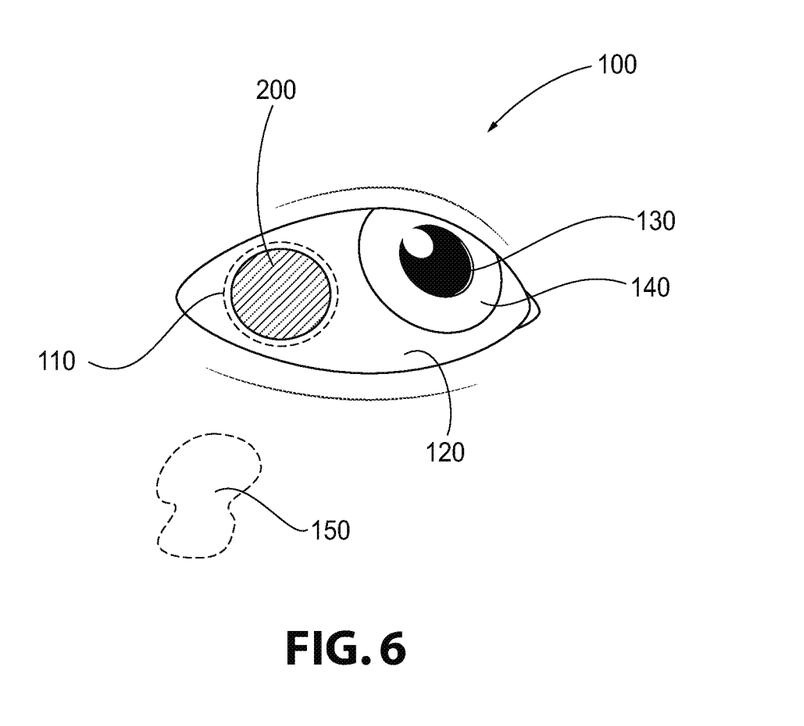
FIG. 6 is a front, schematic view of an ocular surface showing another exemplary positioning of the contact lens.

FIG. 6 illustrates an example of positioning the contact lens 200, e.g., a photochromic contact lens 200, covering— i.e., in contact with—an ocular surface 100 in the form of a human eye. In this example, a wearer can maximize exposure of the sclera 120 during the first and second measurements. It is preferable that the proportion of the region 110 that is comprised by the sclera 120 is as large as possible. The wearer may maximize exposure of the sclera 120 by looking up and to the left or right. It is to be understood that the wearer may look in other directions, such as left, right, up, down, or directly at the imaging device 400. The imaging device 400 takes image data, including data on intensity of electromagnetic radiation reflected from anywhere on the ocular surface 100. However, in order to determine the transmittance of the photochromic contact lens 200, the region 110 of the ocular surface 100 that will be covered by the photochromic contact lens 200 during the second measurement is of particular importance. This covered portion may include a pupil 130, iris 140, and/or sclera 120 of an eye. Due to the relative darkness of the iris 140 and pupil 130, it may be preferable for the region 110 of the ocular surface 100 that will be covered by the photochromic contact lens 200 to be mostly or entirely composed by the sclera 120, in order to reduce error in intensity measurements. This may be preferable when the dynamic range of the imaging device 400 is relatively low.

With further reference to FIG. 6, a wearer maximizes exposure of the sclera 120 of the ocular surface 100, for example, by looking up and to the left or up and to the right. A first intensity measurement of electromagnetic radiation reflected from the ocular surface 100 is taken with the imaging device 400. The exposed portion of the sclera 120 during the first measurement preferably includes the region 110. The contact lens 200 is placed over the region 110 on the ocular surface 100. If the contact lens 200 is a photochromic contact lens 200, the photochromic contact lens 200 is exposed to actinic radiation for a period of time to achieve a desired level of photochromic activation. A second intensity measurement is taken with the imaging device 400. The intensity measurements include data transmitted through the contact lens 200 that is located over the region 110.

With reference to FIGS. 4-6, if the contact lens 200 is a photochromic contact lens 200, the first intensity measurement may be made with the contact lens 200 in place on the ocular surface 100 in a first state. The first state can be a non-activated state. The second intensity measurement can be made with the imaging device 400 after the photochromic contact lens 200 is in a second state. The second state can be an activated state. The second intensity measurement may be taken through a central portion of the contact lens 200. Alternatively, the second intensity measurement may be taken through a peripheral portion of the contact lens 200.

As stated above, due to the relative darkness of the iris 140 and pupil 130, it may be preferable for the region 110 of the ocular surface 100 that will be covered by the photochromic contact lens 200 to be mostly or entirely composed by the sclera 120, in order to reduce error in intensity measurements. However, it is to be understood that the region 110 may be comprised by the iris 140 and/or the pupil 130. According to this configuration, a first image may be taken including a region 110 of the iris 140 and/or pupil 130, then an activated photochromic contact lens 200 may be placed covering the region 110, and a second image may be taken including the same region 110. In such examples, it may be preferable to use an imaging device 400 that is more sensitive than a CCD or CMOS detector, such as traditional photomultiplier arrays, or silicon photomultiplier arrays. Non-limiting examples of suitable arrays are the silicon photomultiplier array manufactured by SensL of Cork, Ireland, and multi-pixel photon counters, manufactured by Hamamatsu Photonics of Hamamatsu City, Japan. When using photomultiplier arrays, care should be taken to avoid damage to the imaging device due to exposure to outdoor conditions.

Where the imaging device 400 comprises a CCD, some of the measured intensity values may be partially-attributable to dark current on the CCD. Dark current can be dependent on the temperature on the CCD. The manufacturer of the imaging device 400 may provide a table or plot of intensity values on the CCD due to dark current. Intensity attributable to dark current at various temperatures can be determined by taking one or more measurements with the imaging device 400 while the shutter is closed. Temperature measurements can be taken with a temperature measuring device concurrently with measuring the first and second intensity values. The imaging device 400 may include a temperature measuring device, or an external temperature measuring device may be used.

In the first and second measurements, intensity data may be taken over a range of wavelengths, or for specific wavelengths. When comparing the data for the two measurements, the following equation may be applied:

$$T_{Meas} = \frac{(I_T - d)}{(I_O - d)}$$

where
$T_{Meas}$ is the transmittance of electromagnetic radiation through the contact lens 200;
$I_O$ is the measurement of the first intensity;
$I_T$ is the measurement of the second intensity; and
d is the intensity value attributable to dark current on the intensity measuring device.

Measured absorbance $A_{Meas}$ of the contact lens 200 is defined as $\log_{10}(1/T)$.

The intensity of electromagnetic radiation measured in the second measurement passes through the contact lens 200 twice, i.e., once when it travels through the contact lens 200 to the ocular surface 100 (region 110) from the light source 300, and once again when it is reflected from the ocular surface 100 (region 110) back through the contact lens 200 to the imaging device 400. In order to correct for electromagnetic radiation passing through the contact lens 200 twice, measured absorbance $A_{Meas}$ is divided by a factor of two to obtain a corrected absorbance value, $A_{Corr}$, or:

$$A_{Corr} = \frac{A_{Meas}}{2}.$$

A value of a corrected transmittance $T_{Corr}$ is calculated as follows:

$$T_{Corr} = 1/10^{A_{corr}}.$$

The above equations reduce to:

$$T_{Corr} = \frac{1}{\sqrt{\frac{I_O - d}{I_T - d}}}$$

It is to be understood that transmittance and absorbance are closely related values. Thus, unless the context explicitly indicates otherwise, any disclosure or teaching in this application referring to determining transmittance also refers to determining absorbance, and vice versa.

It is to be understood that a change in transmittance and/or absorbance may be determined, wherein an unactivated photochromic or non-photochromic contact lens 200 is positioned covering an ocular surface 100. Then a first measurement is taken. Then the contact lens 200 is activated with actinic radiation. Then a second measurement is taken. Then the value of change of transmittance or change of absorbance is determined.

The intensity of electromagnetic radiation emitted by the light source 300 may vary over time. For example, when the method of the invention is practiced in an outdoor environment where the light source 300 is the sun, clouds may pass over the sun between the first and second measurements, affecting the intensity of incident electromagnetic radiation on the ocular surface 100. In order to compensate for variations in incident electromagnetic radiation intensity, the imaging device 400 may take measurements from a secondary location 150. The secondary location 150 can be on, adjacent, or near the ocular surface 100. One or more secondary locations 150 can be on the ocular surface 100 or can be an area adjacent to or near the ocular surface but outside of the region 110. With reference to FIG. 6, the imaging device 400 may take intensity data from the secondary location 150 at the same times when the first and second intensity measurements are taken. The secondary location 150 can be part of the same images or sets of image data which include the intensity data from the first and second measurements. The secondary location 150 may be positioned on the ocular surface 100 that does not comprise the region 110. Or, the secondary location 150 may be located elsewhere, such as on a wearer's face, or on a surface located near the wearer or near the ocular surface 100. Such a surface may be configured to reflect electromagnetic radiation of a specific wavelength range. An example of a secondary location 150 may be a colored tab or dot located on the face of a wearer or located near the ocular surface 100, and which acts as a steady reflector. The secondary location 150 may be white, gray, or any color. Another example of a secondary location 150 may be a portion of a wearer's face that is not covered with a colored tab or dot. FIG. 6 shows an example of the position of the secondary location 150, however, it is to be understood that any suitable surface may be used for secondary location 150.

Comparisons between measured values of electromagnetic radiation reflected from the secondary location 150 between the first and second measurement may be used to compensate for changes in electromagnetic radiation intensity emitted from the light source 300. For example, if intensity data taken from the secondary location 150 indicate a ten percent decrease in intensity of electromagnetic radiation emitted from the light source 300 between the first and second measurements, the values of the first intensity ($I_0$) and/or the second intensity ($I_T$) may be adjusted by that amount when determining a measured transmittance (T) and absorbance ($A_{Meas}$) as well as corrected absorbance ($A_{Corr}$) and corrected transmittance ($T_{Corr}$). This adjustment may be applied by a processor which implements software.

Exemplary software that may be used to analyze the intensity data include Igor Pro, developed by WaveMetrics; Image J, developed by the National Institutes of Health; LabVIEW, developed by National Instruments; Origin and OriginPro, developed by OriginLab; and Microsoft Excel, developed by Microsoft Corporation. Additional software may perform analysis of intensity data, as known in the applicable art.

In yet another exemplary method, a non-activated contact lens 200 may be placed on the ocular surface 100. By "non-activated" is meant that the contact lens 200 has not been exposed to actinic radiation or has not been exposed to actinic radiation of a sufficient intensity and/or for a sufficient time to be fully activated. The non-activated contact lens 200 covers, i.e., is in contact with, at least a portion of the region 110. A first set of intensity data is taken with the imaging device 400 of the region 110 of the ocular surface 100 that is covered by the non-activated contact lens 200. The contact lens 200 is activated, for example, fully activated. A second set of intensity data is taken with the imaging device 400 of the region 110 covered by the now activated contact lens 200. The transmittance is determined by comparing the two sets of intensity data.

In another exemplary method, an activated contact lens 200 is placed on and covering an ocular surface 100, wherein the contact lens 200 does not cover the entire ocular surface 100. Image data are taken with the imaging device 400 of the entire ocular surface 100. Those image data are converted to CIE color coordinated (e.g., CIE XYZ 1931 format, CIE XYZ 1964 format, or CIE XYZ 2004 format) using any process known in the art. CIE X, Y, and Z values from image data from regions of the ocular surface 100 that are covered by the contact lens 200, and regions that are not covered by the contact lens 200, are compared to calculate the change in transmissivity relative to the X, Y, and Z color matching functions. It may be preferable to use CIE Y values, as it peaks around 555 nm. Transmittance may be determined according to the following equation:

$$T_Y = \log_{10}\left(\frac{Y_{uncovered}}{Y_{covered}}\right)$$

where $T_Y$ is transmittance of the contact lens 200 determined according to CIE Y values, $Y_{uncovered}$ is the Y value of a portion of the image of the ocular surface 100, wherein the ocular surface 100 is not covered by the contact lens 200, and $Y_{covered}$ is the Y value of a portion of the image of the ocular surface 100, wherein the ocular surface 100 is covered by the contact lens 200. Transmittance using X and Z values may be determined using the same equation using X and X values, respectively, in place of Y values.

Figure 7:
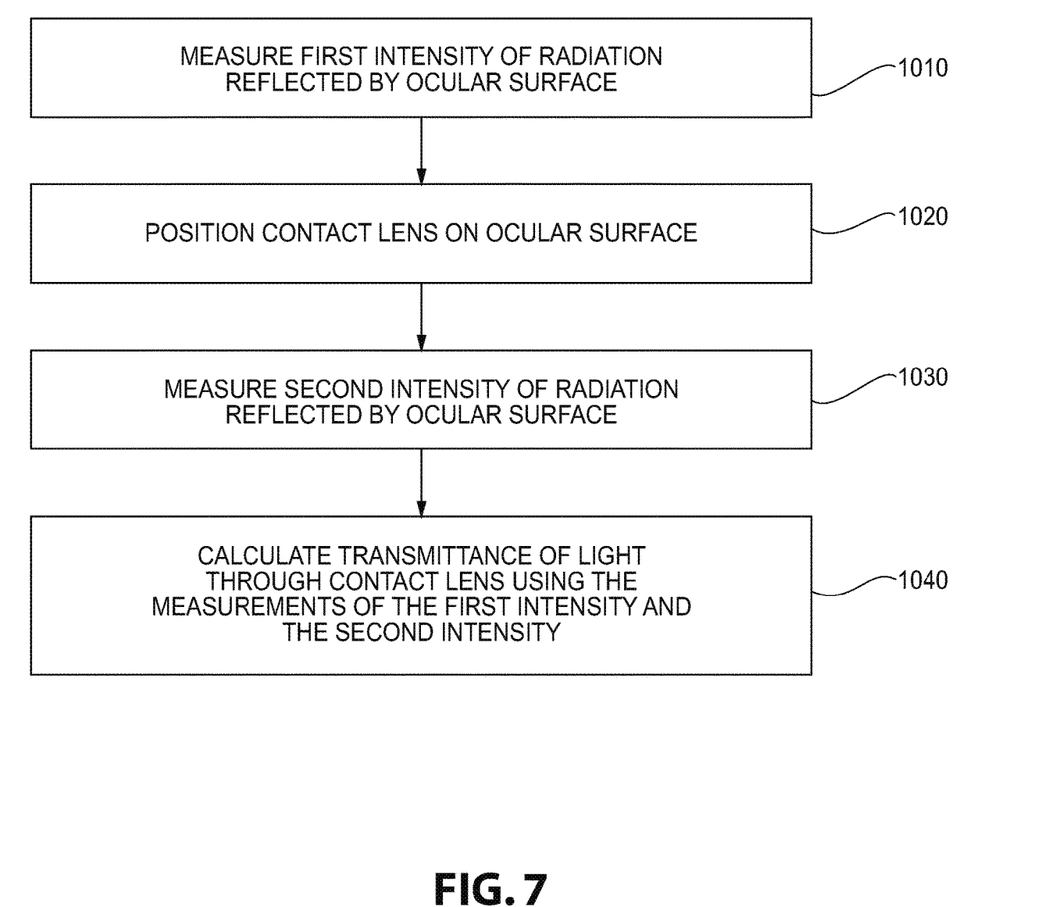
FIG. 7 is a block diagram of an exemplary measurement method of the invention.

FIG. 7 is a block diagram depicting steps of an exemplary method of the invention. Step 1010 includes measuring a first intensity of electromagnetic radiation reflected by an ocular surface. This step may be performed with the intensity measuring device 400. Step 1020 includes positioning contact lens 200 over the surface 100. Step 1030 includes measuring a second intensity of electromagnetic radiation transmitted through the contact lens 200 that is reflected by the ocular surface 100. Step 1040 includes calculating the transmittance of electromagnetic radiation through the contact lens 200 using the measurements of the first intensity and the second intensity.

Figure 8:
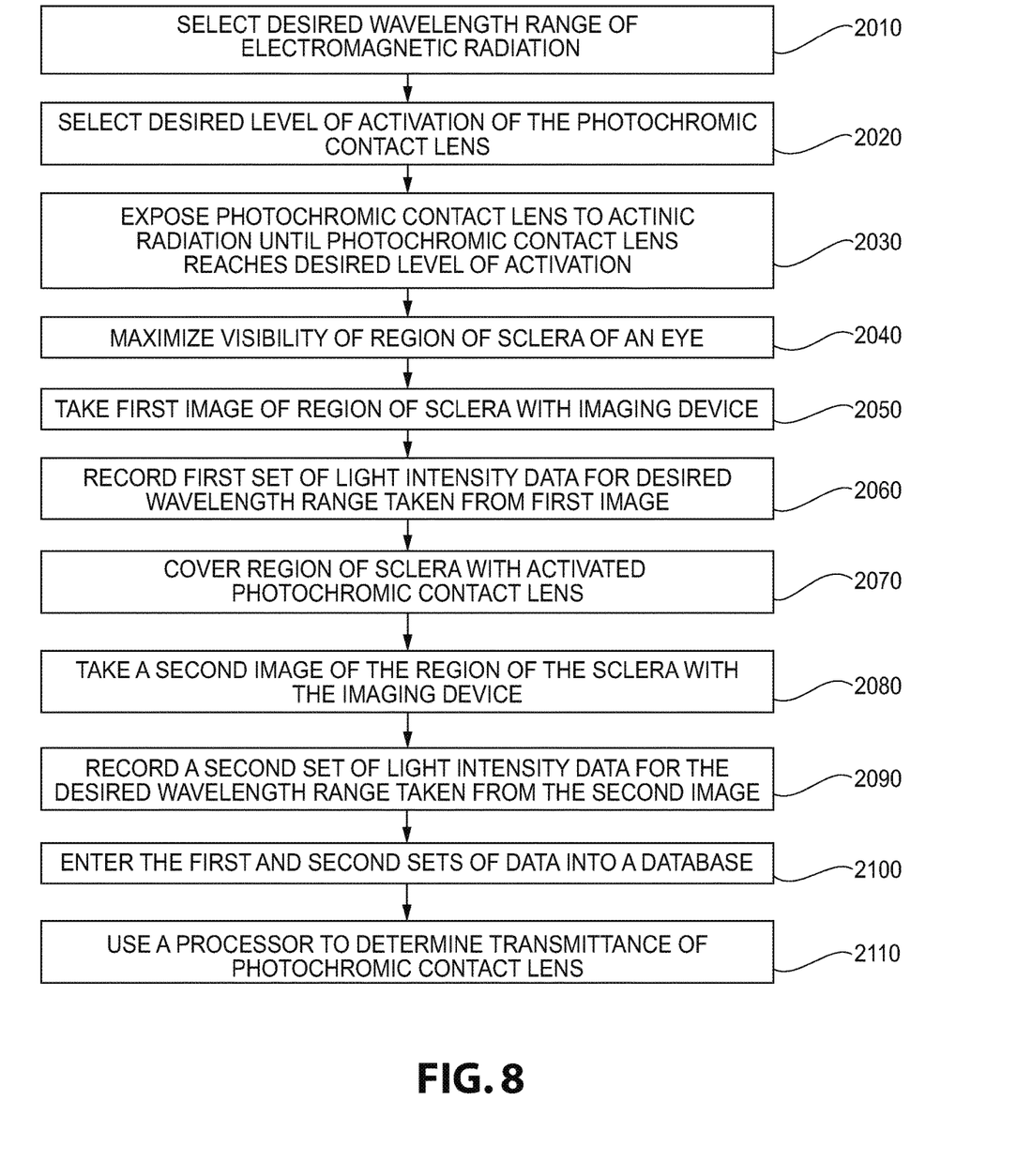
FIG. 8 is a block diagram of another exemplary measurement method of the invention.

FIG. 8 is a block diagram depicting steps of another exemplary method of the invention. Step 2010 includes selecting a desired wavelength range of electromagnetic radiation. Step 2020 includes selecting the desired level of activation of the contact lens 200, preferably a photochromic contact lens 200. Step 2030 includes exposing the photochromic contact lens 200 to actinic radiation until the photochromic contact lens 200 reaches the desired level of activation. Step 2040 includes maximizing visibility of a region 110 of a sclera 120 of an eye. Step 2050 includes taking a first image of the region 110 of the sclera 120 with an imaging device 400. The imaging device 400 may be configured to record electromagnetic radiation intensity data over the desired wavelength range. Step 2060 includes recording a first set of electromagnetic radiation intensity data for the desired wavelength range taken from the first image. Step 2070 includes covering the region 110 of the sclera 120 with the activated photochromic contact lens 200. Step 2080 includes taking a second image of the region 110 of the sclera 120 covered with the photochromic contact lens 200 with the imaging device 400. Step 2090 includes recording a second set of electromagnetic radiation intensity data for the desired wavelength range taken from the second image. Step 2100 includes entering the first and second sets of data into a database. Step 2110 includes using a processor to determine the transmittance of the photochromic contact lens 200.

The invention according to the present disclosure may be further illustrated by the following example. This example does not limit the invention. It is meant only to suggest modes of practicing the invention. Those knowledgeable in optics as well as other specialties may find other modes of practicing the invention. However, those modes are to be deemed to be within the scope of this invention.

Example 1

Example 1 relates to the measurement of transmittance and absorbance of a photochromic contact lens in an outdoor environment.

Measurements according to the present invention were taken of a contact lens on an ocular surface on an outdoor testing platform in full sun. The imaging device was an uncalibrated AVT camera set to an F-number of 8, and was white balanced. The photochromic contact lens tested was impregnated with a broad-band absorbing photochromic dye, and values in the Red, Green, and Blue (RGB) planes still were obtainable. The ocular surface was a human eye. No RGB filter was applied to the lens of the camera. Because the photochromic dye in the subject lenses absorbed over a broad spectrum, an RGB filter was deemed unnecessary for the measurements according to this Example. Image data were analyzed using Igor Pro 6.37. The measured photochromic lens was activated on-eye for 20 minutes in ambient light prior to measurement. Transmittance values through the photochromic lens were determined based on the difference in intensity data between two images taken of the subject eye. Because the transmittance value was determined based on light reflected from the eye, the absorbance value was corrected by a factor of two, as described above. Intensity values were measured in "counts," which are units of scaled voltage. Prior to measurements, a dark value in the Red, Green, and Blue planes was determined.

The image data also included an area surrounding the subject eye, from which intensity data from a secondary location could be obtained, as described above. The secondary location was located off of the subject eye. Changes in ambient intensity between the two measurements were accounted for based on a percentage change in intensity data reflected from the secondary location, and a corrective multiplier was determined based on the inverse of this value. Intensity data from the secondary location are referred to as a third intensity measurement—which corresponds to image data taken at the time of the first intensity measurement from the contact lens—and as a fourth intensity measurement, which corresponds to image data taken at the time of the second intensity measurement of the contact lens. The values obtained are shown in Table 1, below. The "Corrective Transmittance" is the value for the Uncorrected Transmittance with the corrective multiplier applied. The "Corrected Absorbance" values were obtained from the Corrected Transmittance values, corrected by a factor of two, as described above.

TABLE 1

| Measurement of contact lens | Raw intensity (counts) | Standard deviation (counts) | Uncorrected Transmittance | Corrected Transmittance | Corrected Absorbance |
|---|---|---|---|---|---|
| Red dark intensity | 16 | 11 | 0.45 | 0.46 | 0.17 |
| Red first intensity | 12555 | 2501 | | | |
| Red second intensity | 5600 | 833 | | | |
| Green dark value | 15 | 6 | 0.40 | 0.42 | 0.19 |
| Green first intensity | 9462 | 2547 | | | |
| Green second intensity | 3799 | 717 | | | |

TABLE 1-continued

| | | | | | |
|---|---|---|---|---|---|
| Blue Dark | 16 | 6 | 0.43 | 0.45 | 0.17 |
| Blue first intensity | 6980 | 2069 | | | |
| Blue second intensity | 3017 | 633 | | | |

| Measurement of secondary area | Raw intensity (counts) | Standard deviation (counts) | Secondary area intensity correction | Correction multiplier |
|---|---|---|---|---|
| Red Dark | 16 | 11 | 0.969 | 1.032 |
| Red third intensity | 11907 | 601 | | |
| Red fourth intensity | 11534 | 603 | | |
| Green Dark | 15 | 6 | 0.944 | 1.059 |
| Green third intensity | 7658 | 749 | | |
| Green fourth intensity | 7230 | 722 | | |
| Blue Dark | 16 | 6 | 0.961 | 1.041 |
| Blue third intensity | 5727 | 872 | | |
| Blue fourth intensity | 5503 | 788 | | |

The invention further may be characterized by one or more of the following clauses.

Clause 1. A method for determining a transmittance of electromagnetic radiation through a contact lens 200 in direct contact with an ocular surface 100 comprises: measuring a first intensity of radiation reflected by at least a portion of an ocular surface 100; positioning a contact lens 200 covering at least a portion of the ocular surface 100; measuring a second intensity of radiation transmitted through the contact lens 200 that is reflected by at least one region 110 of the ocular surface 100 that is covered by the contact lens 200; and calculating a transmittance of electromagnetic radiation through the contact lens 200 using the measurements of the first intensity and the second intensity.

Clause 2. The method of clause 1, wherein the measuring steps are accomplished with an intensity measuring device 400, preferably an imaging device.

Clause 3. The method of clause 2, which further comprises: determining an intensity value attributable to dark current on the intensity measuring device 400; and calculating the transmittance of electromagnetic radiation through the contact lens 200 according to the following equation:

$$T_{Corr} = \frac{1}{\sqrt{\frac{I_O - d}{I_T - d}}},$$

where $T_{Corr}$ is the transmittance of electromagnetic radiation through the contact lens 200; $I_O$ is the measurement of the first intensity; $I_T$ is the measurement of the second intensity; and d is the intensity value attributable to dark current on the intensity measuring device 400.

Clause 4. The method of any of clauses 1 to 3, further comprising: measuring the first intensity at a first location of the ocular surface 100; and measuring the second intensity at the first location of the ocular surface 100.

Clause 5. The method of clause 4, further comprising: measuring a third intensity of radiation reflected from a secondary location 150 contemporaneously with measuring the first intensity, wherein the at least one region 110 is different than the secondary location 150; measuring a fourth intensity of radiation reflected from the secondary location 150 contemporaneously with measuring the second intensity; comparing the third intensity to the fourth intensity to determine a change in intensity of radiation between times of measurement of the first and third intensities and the second and fourth intensities; and compensating for the change in intensity of radiation between times of measurement of the first and third intensities and the second and fourth intensities in the calculation of the transmittance of electromagnetic radiation through the contact lens 200 using the comparison between the third and fourth intensities.

Clause 6. The method of any of clauses 2 to 5, wherein the intensity measuring device 400 is configured to measure intensity of electromagnetic radiation within a spectrum of electromagnetic radiation comprising a wavelength range of 1 nm to 1,000 nm, preferably 380-780 nm.

Clause 7. The method of any of clauses 2 to 6, wherein the intensity measuring device 400 is configured to measure intensity of electromagnetic radiation over a spectrum of electromagnetic radiation comprising a wavelength range of 460±20 nm.

Clause 8. The method of any of clauses 2 to 7, wherein the intensity measuring device 400 is configured to measure intensity of electromagnetic radiation over a spectrum of electromagnetic radiation comprising a wavelength range of 555±20 nm.

Clause 9. The method of any of clauses 2 to 8, wherein the intensity measuring device 400 is configured to measure intensity of electromagnetic radiation over a spectrum of electromagnetic radiation comprising a wavelength range of 635±20 nm.

Clause 10. The method of any of clauses 1 to 9, wherein the measurements of the first and second intensities are from a range of wavelengths selected from the group consisting of 460±20 nm, 555±20 nm, and 635±20 nm.

Clause 11. The method of any of clauses 2 to 10, further comprising applying a filter 450 over a detector of the intensity measuring device 400 prior to measuring the first and second intensities.

Clause 12. The method of clause 11, wherein the filter 450 is centered on a wavelength selected from the group consisting of 460±20 nm, 555±20 nm, and 635±20 nm.

Clause 13. The method of clauses 11 or 12, wherein the filter 450 is a three-wavelength notch filter.

Clause 14. The method of any of clauses 1 to 13, wherein the ocular surface 100 comprises a human eye.

Clause 15. The method of clause 14, wherein the ocular surface 100 comprises at least a portion of a sclera of the eye.

Clause 16. The method of clause 15, further comprising measuring the value of the second intensity over a central portion or a peripheral portion of the contact lens 200.

Clause 17. The method of any of clauses 1 to 16, wherein the contact lens 200 is a photochromic contact lens 200 or a tinted contact lens 200.

Clause 18. A method for determining a transmittance of a photochromic contact lens 200 at a desired level of activation, comprises selecting the desired wavelength range of electromagnetic radiation; selecting a desired level of activation of the photochromic contact lens 200; exposing the photochromic contact lens 200 to actinic radiation until the photochromic contact lens 200 reaches the desired level of activation; maximizing visibility of a region 110 of a sclera 120 of an eye; taking a first image of the region 110 of the sclera 120 with an imaging device 400, wherein the imaging device 400 is configured to record electromagnetic radiation intensity data over the desired wavelength range; recording a first set of electromagnetic radiation intensity data for the desired wavelength range taken from the first image; covering the region 110 of the sclera 120 with the activated photochromic contact lens 200; taking a second image of the region 110 of the sclera 120 with the imaging device; recording a second set of electromagnetic radiation intensity data for the desired wavelength range taken from the second image; entering the first and second sets of data into a database; and using a processor to determine the transmittance of the photochromic contact lens 200.

Clause 19. The method of clause 18, further comprising applying a filter 450 over the imaging device 400 prior to taking the first and second images.

Clause 20. The method of clause 19, wherein the filter 450 is centered on a wavelength selected from the group consisting of 460±20 nm, 555±20 nm, and 635±20 nm.

Clause 21. The method of clauses 19 or 20, wherein the filter 450 is a three-wavelength notch filter.

Clause 22. A method for determining the transmittance of electromagnetic radiation through a contact lens 200 comprises: positioning a non-activated contact lens 200 on a portion of an ocular surface 100; measuring a first intensity of radiation reflected by a region 110 of the ocular surface 100 covered by the contact lens 200; activating the contact lens 200; measuring a second intensity of radiation reflected by a region 110 of the contact lens 200 that is covered by the contact lens 200; and calculating the transmittance of electromagnetic radiation through the contact lens 200 using the measurements of the first intensity and the second intensity.

Clause 23. A method for determining the transmittance of electromagnetic radiation through a contact lens 200 comprises: measuring a first intensity of radiation reflected by a region 110 of an ocular surface 100 covered by an activated photochromic contact lens 200; measuring a second intensity of radiation reflected by a region of the ocular surface 100 that is not covered by the contact lens 200; converting the first and second measurements to CIE color coordinates; and calculating the transmittance of electromagnetic radiation through the contact lens 200 using the difference in the CIE color coordinates.

Clause 24. The method of any of clauses 1 to 23, wherein the contact lens 200 is in direct contact with the ocular surface 100.

Clause 25. The method of clause 1, wherein the contact lens 200 is positioned on and covering the ocular surface 100 before measuring the first and second intensities, wherein the measurements of the first intensity and the second intensity are taken from a same image, wherein the first intensity is measured from a portion of the ocular surface 100 that is not covered by the contact lens 200, wherein the second intensity is measured from a portion of the ocular surface 100 that is covered by the contact lens 200, and the method further comprises: converting the measurement of the first intensity to CIE XYZ values; converting the measurement of the second intensity to CIE XYZ values; and determining the transmittance according to the following equation:

$$T_Y = \log_{10}\left(\frac{Y_{uncovered}}{Y_{covered}}\right),$$

where $T_Y$ is the transmittance of the contact lens 200 determined according to CIE Y values, Yuncovered is a Y value of the portion of the image of the ocular surface 100 when the ocular surface 100 is not covered by the contact lens 200, and Ycovered is a Y value of the portion of the image of the reference surface when the ocular surface 100 is covered by the contact lens 200.

Clause 26. A measurement system 100 for determining a transmittance of a photochromic contact lens 200 comprises a light source 300 and an intensity measuring device 400.

Clause 27. The measurement system 10 of clause 26, further including an ocular surface 100.

Clause 28. The measurement system 10 of clauses 26 or 27, wherein the light source 300 is a natural light source or an artificial light source.

Clause 29. The measurement system 10 of any of clauses 26 to 28, wherein the intensity measuring device 400 comprises an imaging device.

Clause 30. The measurement system 10 of any of clauses 27 to 29, wherein the intensity measuring device 400 is configured to measure intensity of radiation over a spectrum of electromagnetic radiation comprising a wavelength range of 380-780 nm.

Clause 31. The measurement system 10 of any of clauses 27 to 30, wherein the intensity measuring device 400 is configured to measure intensity of radiation over a spectrum of electromagnetic radiation comprising a wavelength range of 460±20 nm.

Clause 32. The measurement system 10 of any of clauses 27 to 31, wherein the intensity measuring device 400 is configured to measure intensity of radiation over a spectrum of electromagnetic radiation comprising a wavelength range of 555±20 nm.

Clause 33. The measurement system 10 of any of clauses 27 to 32, wherein the intensity measuring device 400 is configured to measure intensity of radiation over a spectrum of electromagnetic radiation comprising a wavelength range of 635±20 nm.

Clause 34. The measurement system 10 of any of clauses 27 to 33, further comprising a filter 450 over a detector of the intensity measuring device 400.

Clause 35. The measurement system 10 of clause 34, wherein the filter 450 is centered on a wavelength selected from the group consisting of 460±20 nm, 555±20 nm, and 635±20 nm.

Clause 36. The measurement system 10 of clauses 34 or 35, wherein the filter 450 is a three-wavelength notch filter.

Clause 37. The measurement system 10 of any of clauses 27 to 36, wherein the ocular surface 100 comprises a human eye.

Clause 38. The method of any of clauses 1 to 17, wherein the contact lens 200 is a photochromic contact lens 200, preferably a photochromic contact lens, and the method includes at least partly activating the photochromic contact lens 200 between measuring the first intensity and measuring the second intensity.

Although the disclosure has been described in detail for the purpose of illustration based on what are currently considered to be the most practical and preferred aspects, it is to be understood that such detail is solely for that purpose and that the disclosure is not limited to the disclosed aspects, but is intended to cover modifications and equivalent arrangements. For example, it is to be understood that the present disclosure contemplates that, to the extent possible, one or more features of any aspect can be combined with one or more features of any other aspect.

The invention claimed is:

1. A method for determining a transmittance of electromagnetic radiation through a contact lens in direct contact with an ocular surface, comprising:
   measuring a first intensity of radiation reflected by at least a portion of an ocular surface with an intensity measuring device;
   positioning a contact lens covering and in direct contact with at least a portion of the ocular surface;
   measuring a second intensity of radiation transmitted through the contact lens that is reflected by at least one region of the ocular surface that is covered by the contact lens with the intensity measuring device; and
   calculating a transmittance of electromagnetic radiation through the contact lens using the measurements of the first intensity and the second intensity.

2. The method according to claim 1, further comprising:
   determining an intensity value attributable to dark current on the intensity measuring device; and
   calculating the transmittance of electromagnetic radiation through the contact lens according to the following equation:

$$T_{Corr} = \frac{1}{\sqrt{\frac{I_O - d}{I_T - d}}}$$

where:
$T_{Corr}$ is the transmittance of electromagnetic radiation through the contact lens;
$I_O$ is the measurement of the first intensity;
$I_T$ is the measurement of the second intensity; and
d is the intensity value attributable to dark current on the intensity measuring device.

3. The method according to claim 1, further comprising:
   measuring a third intensity of radiation reflected from a secondary location contemporaneously with measuring the first intensity, wherein the at least one region is different than the secondary location
   measuring a fourth intensity of radiation reflected from the secondary location contemporaneously with measuring the second intensity;
   comparing the third intensity to the fourth intensity to determine a change in intensity of radiation between times of measurement of the first and third intensities and the second and fourth intensities; and
   compensating for the change in intensity of radiation between times of measurement of the first and third intensities and the second and fourth intensities in the calculation of the transmittance of electromagnetic radiation through the contact lens using the comparison between the third and fourth intensities.

4. The method according to claim 1, wherein the intensity measuring device is configured to measure intensity of electromagnetic radiation within a spectrum of electromagnetic radiation comprising a wavelength range of 1 nm to 1,000 nm.

5. The method according to claim 1, wherein the intensity measuring device is configured to measure intensity of electromagnetic radiation over a spectrum of electromagnetic radiation comprising a wavelength range of 460±20 nm.

6. The method according to claim 1, wherein the intensity measuring device is configured to measure intensity of electromagnetic radiation over a spectrum of electromagnetic radiation comprising a wavelength range of 555±20 nm.

7. The method according to claim 1, wherein the intensity measuring device is configured to measure intensity of electromagnetic radiation over a spectrum of electromagnetic radiation comprising a wavelength range of 635±20 nm.

8. The method according to claim 1, wherein the measurements of the first and second intensities are from a range of wavelengths selected from the group consisting of 460±20 nm, 555±20 nm, and 635±20 nm.

9. The method according to claim 1, further comprising:
   applying a filter over a detector of the intensity measuring device prior to measuring the first and second intensities.

10. The method according to claim 9, wherein the filter is centered on a wavelength selected from the group consisting of 460±20 nm, 555±20 nm, and 635±20 nm.

11. The method according to claim 1, wherein the ocular surface comprises at least a portion of a human eye.

12. The method according to claim 1, wherein the contact lens is a photochromic contact lens or a tinted contact lens.

13. The method according to claim 12, further comprising:
   measuring the value of the second intensity over a substantially central portion or a peripheral portion of the contact lens.

14. The method according to claim 1, wherein the contact lens is a photochromic contact lens and the method comprises:
   selecting a desired wavelength range of electromagnetic radiation;
   selecting a desired level of activation of the photochromic contact lens; and
   exposing the photochromic contact lens to actinic radiation until the photochromic contact lens reaches the desired level of activation, wherein the ocular surface comprises an eye, wherein the at least one region is located on a sclera of the eye, wherein the intensity measuring device is an imaging device configured to record electromagnetic radiation intensity data over the desired wavelength range, wherein measuring the first intensity of radiation reflected by the ocular surface with the intensity measuring device comprises taking a first image of the region of the sclera with the imaging device, wherein positioning the photochromic contact lens covering the ocular surface comprises covering the region of the sclera with the activated photochromic contact lens, wherein measuring the second intensity of radiation reflected by the region of the ocular surface that is covered by the photochromic contact lens with the intensity measuring device comprises maximizing visibility of the region of the sclera, and taking a second image of the region of the sclera with the imaging device, and wherein calculating the transmittance of electromagnetic radiation through the photochromic contact lens using the measurements of the first intensity and the second intensity comprises:

recording a first set of electromagnetic radiation intensity data for the desired wavelength range taken from the first image;

recording a second set of electromagnetic radiation intensity data for the desired wavelength range taken from the second image;

entering the first and second sets of data into a database; and using a processor to determine the transmittance of electromagnetic radiation through the photochromic contact lens.

15. The method according to claim 1, wherein the contact lens is positioned covering the ocular surface before measuring the first and second intensities, wherein the measurements of the first intensity and the second intensity are taken from a same image, wherein the first intensity is measured from a portion of the ocular surface that is not covered by the contact lens, wherein the second intensity is measured from a portion of the ocular surface (100) that is covered by the contact lens, and the method further comprises:

converting the measurement of the first intensity to CIE XYZ values;

converting the measurement of the second intensity to CIE XYZ values; and determining the transmittance according to the following equation:

$$T_Y = \log_{10}\left(\frac{Y_{uncovered}}{Y_{covered}}\right)$$

where:

$T_Y$ is the transmittance of the contact lens determined according to CIE Y values;

$Y_{uncovered}$ is a Y value of the portion of the image of the ocular surface, wherein the ocular surface is not covered by the contact lens; and $Y_{covered}$ is a Y value of the portion of the image of the ocular surface, wherein the ocular surface is covered by the contact lens.

16. The method according to claim 1, wherein the intensity measuring device is configured to measure intensity of electromagnetic radiation within a spectrum of electromagnetic radiation comprising a wavelength range of 380-780 nm.

17. The method according to claim 9, wherein the filter comprises a three-wavelength notch filter.

18. The method according to claim 11, wherein the ocular surface comprises at least a portion of a sclera of the eye.

* * * * *